Patented May 10, 1932

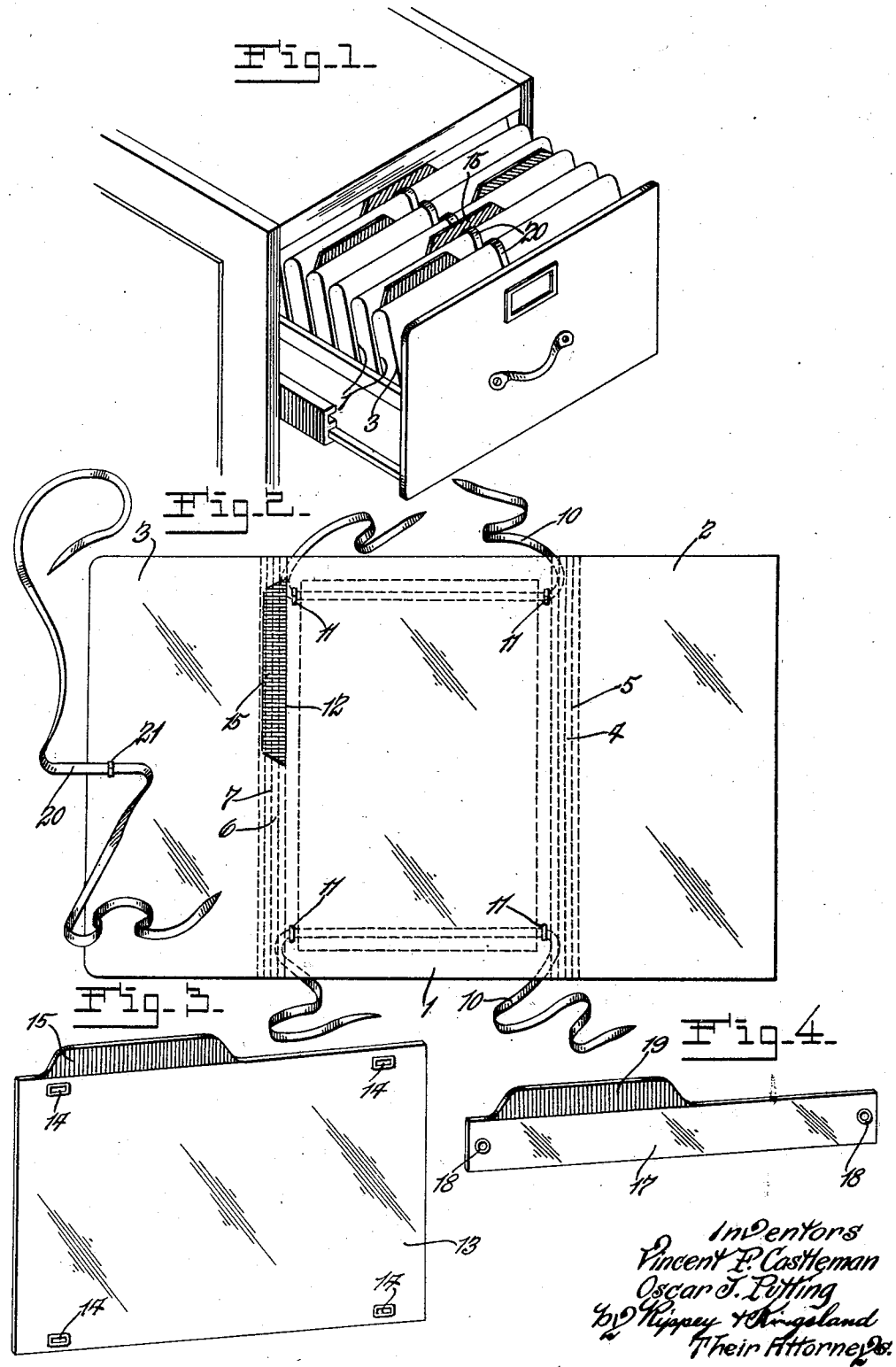

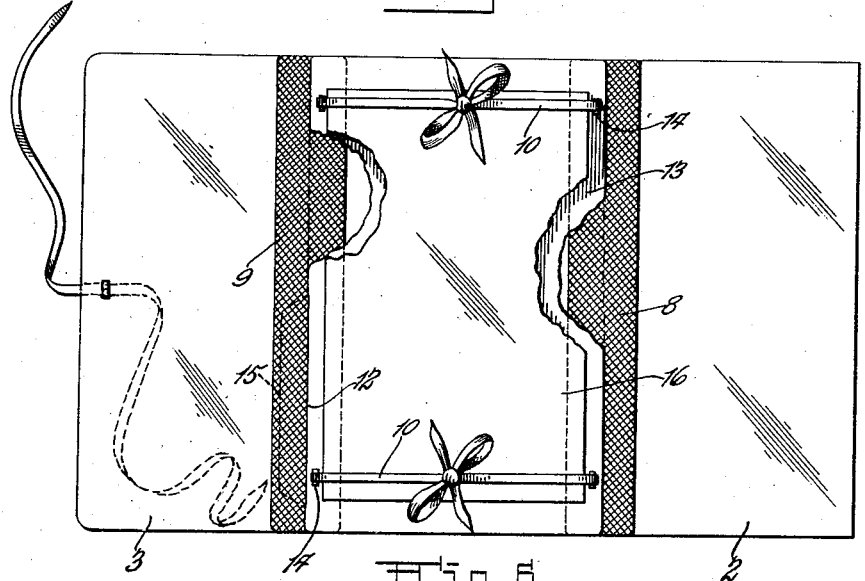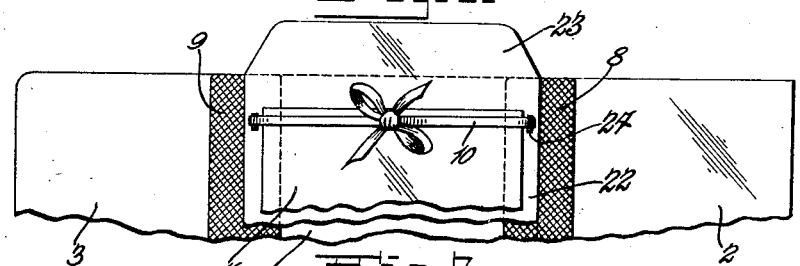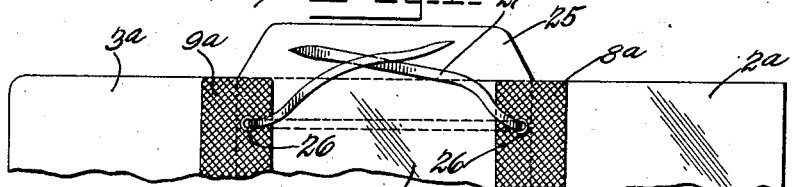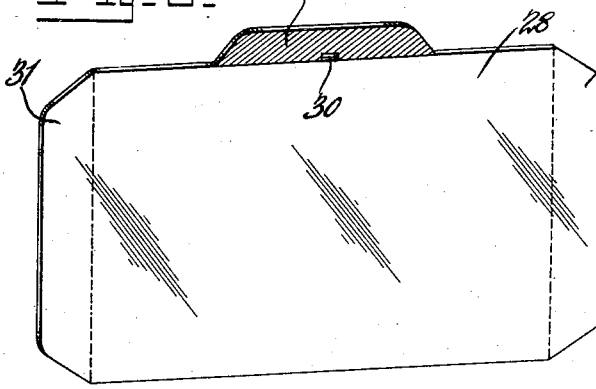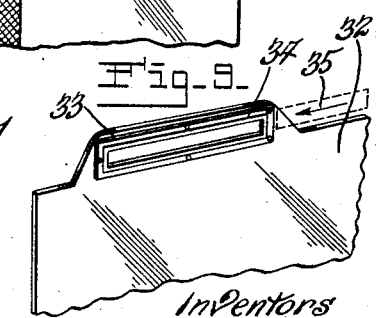

1,857,838

UNITED STATES PATENT OFFICE

VINCENT F. CASTLEMAN, OF OAK PARK, AND OSCAR J. PUTTING, OF SPRINGFIELD, ILLINOIS

VERTICAL FILING DEVICE

Application filed November 3, 1930. Serial No. 492,931.

This invention relates to vertical filing devices.

An object of the invention is to provide an improved filing device comprising a foldable wrapper constructed and arranged to enclose and enfold papers and the like in combination with means for securing and holding the papers and the like in proper relative relationship in connection with the wrapper and an index device in connection with the wrapper designating either the specific or general subject matter of the papers and the like enclosed in the wrapper.

Another object of the invention is to provide an improved vertical filing device having a removable and interchangeable index device and means for detachably securing the same in connection with the filing device.

Other objects of the invention are to provide vertical filing devices constructed and so characterized that they are appropriately expansible so as to enfold few or many sheets of paper with equal advantage; to provide an improved index for use in connection with each filing device to indicate a specific or general subject matter of the papers enfolded in the filing device; to provide means for reinforcing or stiffening the filling device so as to maintain the sides thereof approximately parallel irrespective of the thickness of the papers or documents contained in the filing device; and means for indexing the subject matter of each filing device.

Various other objects and advantages of the invention will be made apparent by the following description, reference being made to the accompanying drawings, in which—

Fig. 1 is a perspective view showing a number of our improved indexed vertical filing devices supported in a cabinet drawer.

Fig. 2 is an outside plan view of one of the filing devices.

Fig. 3 is a perspective view of the combined index and reinforcing member for interchangeable use in connection with selected filling devices.

Fig. 4 is a perspective view of an index element designed for optional temporary or permanent attachment to one of the filing devices.

Fig. 5 is an inside plan view of one of the filing devices equipped with its combined index and stiffening element and also with a covering member for the papers enclosed in the file.

Fig. 6 is an inside plan view of a portion of one end portion of a filing device showing the stiffening and index member equipped with foldable extensions at its end for folding around the ends of the papers enclosed in the folding device.

Fig. 7 is a view showing an end portion of one of the filing devices having the middle panel formed with integral end extensions that are foldable to enclose the ends of the papers enfolded in the filing device.

Fig. 8 is a perspective view of a combined index and reinforcing member having foldable end extensions to fold around the ends of the papers contained in the filing device and having an index portion approximately midway of its ends.

Fig. 9 is a perspective view of a portion of a metallic combined index and reinforcing member equipped with a frame for supporting an index card.

Our improved vertical filing device may be made of paper or other appropriate non-metallic material or, if desired, it may be made in part or entirely of metal. The invention does not reside in the use or selection of any specific material, but we contemplate the use of such material as may be best suited for the purposes to which the filing devices are to be applied by different users.

In the construction shown in Fig. 2, the filing device comprises a sheet of material composed of a middle panel 1, a side panel 2 united with one longitudinal edge of the panel 1, and a side panel 3 united with the opposite longitudinal edge of said panel 1. In Fig. 2 of the drawings, the panel 2 is shown as having hinge connection with the panel 1 and integrally united therewith. The hinge connection comprises a strip 4 integrally uniting the panels 1 and 2 and characterized by greater flexibility than either of said panels. This greater flexible characteristic may be obtained by a number of score lines 5 formed longitudinally along the strip 4 so as to permit easy folding of the strip 4 along any or all of said score lines.

The panel 3 has similar hinge connection with the longitudinal edge of the panel 1 opposite from the panel 2. The hinge connection uniting the panel 3 with the panel 1 comprises a strip 6 integrally uniting the panels 1 and 3 and characterized by greater flexibility than either of said panels 1, 2 or 3. This greater flexible characteristic may be obtained by a number of score lines 7 formed longitudinally along the strip 6 so as to permit easy folding of the strip 6 along any or all of said score lines.

It is clear that the provision of the several score lines 5 and 7 provides a vertical filing device in which the papers may be stacked upon the inner side of the panel 1, after which the panel 2 may be folded against the top of the stacked papers, and the panel 3 then folded against the outer surface of the panel 2 so as to provide a closed file enfolding the stacked papers. When only a few papers are enclosed within the file, the pivotal action of the panels 2 and 3 will be along only a few of the lines 5 and 7. Obviously, more of said lines 5 and 7 will be utilized to obtain pivotal action of the panels 2 and 3 when the thickness of the stack of papers is increased.

The hinge connection of the panel 1 with the panel 2 also includes a longitudinal strip 8 of textile fabric, or other appropriate hinge forming material, adhesively secured to the inner side of the strip 4. And the hinge connection of the panel 1 with the panel 3 includes a similar longitudinal strip 9 adhesively secured to the inner side of the strip 6. These separate hinge strips 8 and 9 do not interfere with the pivotal action of the panels 2 and 3 but greatly strengthen their connection with the middle panel 1.

Near each end of the panel 1 a tape or string 10 is secured by appropriate fastening devices, such as staples 11, driven through the panel 1 and clinched. A pair of staples 11 are provided near each end of the panel 1 for each tape or string 10. These staples 11 are spaced slightly from the hinge strips 4 and 6 so as not to interfere with the pivotal action of the panels 2 and 3. These tapes or strings 10 are of sufficient length to extend around any stack of papers for which the respective filing devices are intended.

In the hinge device 6, a longitudinal slot 12 is formed. Preferably this slot 12 is formed at the edge of the panel 1 and at the union of said panel with the hinge strip 6, although the location of the slot 12 may be varied, if desired.

An index device constructed and designed for interchangeable use with the respective filing devices is included in the invention. One such index device is shown in Fig. 3 and comprises a sheet 13 of approximately the same area as the middle panel 1. This sheet 13 is equipped with eyelets 14 through which the tape or string 10 may be extended, as clearly shown in Fig. 5 of the drawings. The sheet 13 has a lateral projection 15 along one edge which is designed and arranged to be extended through the slot 12 and thus extend beyond the upper edge of the filing device when the filing device is placed in a vertical position in a cabinet or elsewhere. The slots 12 in adjacent filing devices are offset from each other, so that the index projections 15 for the respective filing devices will be offset laterally from each other in order that all of said index devices may be easily visible. This will be understood by reference to Fig. 1 of the drawings. The sheet 13 lies against the inner side of the panel 1 and constitutes a reinforcement for said panel 1 to prevent said panel from bulging or extending outwardly too far. Thus, the sheet 13 constitutes a support for the index 15 and also functions as a strengthening device for the middle panel 1.

Our invention also comprises a sheet 16 designed and adapted to be laid upon the top of the stack of papers that are stacked upon the sheet 13. This sheet 16 has its ends engaged within the loops formed by the tied tapes or strings 10 (Fig. 5) and is thus secured against the top of the stack of papers and holds said papers extended in flat condition and prevents the intermediate portion of the papers between the strings 10 from bulging in an undesirable manner. Thus, the sheet 16 cooperates with the panels 2 and 3 to hold the file and its contents in proper order and with the sheet 13 reinforcing the inner panel.

Our invention also comprises an index device comprising a relatively narrow elongated strip 17 having near each end an eyelet 18 to receive the tapes or strings 10, and having along one edge an index extension 19 arranged and designed to extend through the slot 12 of the filing device to which it is applied and to extend beyond the upper edge of said filing device in the manner of the extensions 15.

The extensions 15 and 19 of the respective index devices are distinctively colored, each color being arranged to designate specifically or generally the subject of the contents of a file. The linings for colors on these index extensions in Fig. 1 of the drawings indicate contrasting colors.

A tape or string 20 is attached to the outer side of the panel 3 by a staple 21, or other appropriate fastening device. When the file is closed, this tape or string 21 will extend around the filing device and may be tied or fastened to secure the file in its closed position.

The construction shown in Fig. 6 is exactly the same as that already described with the exception that the combined index and reinforcing member is of different construction. The index or reinforcing device shown in Fig. 6 comprises a sheet 22 having a width approximately equal to the width of the middle panel 1 and having on each end an extension 23 projecting beyond the ends of the panel 1 and arranged to be folded around and against the ends of the papers stacked on the panel 1. This sheet 22 has eyelets 24 corresponding to the eyelets 14 and for a similar purpose. To the remaining parts shown in Fig. 6 that correspond to parts already described, like reference numerals are applied.

To the parts of the device shown in Fig. 7 that correspond to parts previously described, the same reference numerals that are applied to the parts previously described are given with the exponent $a$. The middle panel $1^a$ is provided at its ends with extensions 25 constructed and arranged to fold against and around the ends of papers enclosed in the file so as to cover and protect the papers. The middle panel $1^a$ has at each end a pair of eyelets 26 through which tapes or strings 27 are passed. The intermediate portion of each tape or string 27 extends along the outer surface of the panel $1^a$ and the end portions of said strings or tapes are on the inner side of the panel $1^a$ in position for convenient tying and untying to secure and release the filed papers.

In Fig. 8 of the drawings, a combined index and reinforcing member is shown to be laid upon the top of the stack of papers after the papers have been placed upon the middle panel of the filing device and secured thereto by the strings or tapes described. This index and strengthening device comprises a sheet of material 28 having on one edge an extension 29 designed and arranged to extend through a slot 12. When this index device 29 is at the middle of the sheet 28, it is formed with a hole 30 through which the tape or string 20 may be extended for use in holding the file closed. In this case, the string 20 constitutes a holder preventing removal of the sheet 28 from the filing device until the string 20 is withdrawn from the hole 30. Each end of the sheet 28 is formed with an extension 31 similar to the extension 23 and arranged to be folded around and against the ends of the papers in the file.

Any or all of the index and strengthening devices may be made of cardboard or other appropriate non-metallic material or they may be made of metallic sheets. We contemplate the use of such material as may be deemed best.

In Fig. 9, we have shown an index and reinforcing member comprising a metallic sheet 32 of approximately equal area to the panel 1 of a filing device and having along one edge a lateral extension 33 designed and arranged to extend through a slot 12 to project beyond the folded edge of the filing device and functioning as an index element. The extension 33 may be provided with a frame 34 to receive an insertable and withdrawable index card when desired. Thus, the index cards 35 may be distinctively colored, so that the distinctive colors will function to indicate the general or specific subjects of the respective files; or said cards 35 may have the indexes printed or otherwise displayed thereon.

Our invention may be modified in various other respects without departure from the nature and principle thereof. We do not restrict ourselves in any other unessential particulars, but what we claim and desire to secure by Letters Patent is:

1. A device of the character described comprising a middle panel, a pair of side panels pivotally connected with the middle panel for enclosing the contents of a file placed upon the middle panel, and a reinforcing member secured to the inner side of one of said panels and having an index tab projecting beyond the pivotal connection of one of said side panels with said middle panel.

2. A device of the character described comprising a middle panel, a pair of side panels pivotally connected with the middle panel for enclosing the contents of a file placed upon the middle panel, an index tab projecting beyond the pivotal connection of one of said side panels with said middle panel, and a reinforcing sheet supporting said index tab and being enclosed by said panels when said panels are in closed position.

3. A device of the character described comprising a middle panel, a pair of side panels each having pivotal connection with one of the side edges of said middle panel and being foldable to cooperate with said middle panel to enclose papers placed upon said middle panel, means for securing papers upon said middle panel, a reinforcing member cooperating with said middle panel, and an index tab in connection with said reinforcing member and projecting through and laterally from one of said pivotal connections.

4. A device of the character described comprising a middle panel, a pair of side panels each having pivotal connection with one of the side edges of said middle panel and being foldable to cooperate with said middle panel to enclose papers placed upon said middle panel, means for securing papers upon said middle panel, a reinforcing member cooperating with said middle panel, an index tab in connection with said reinforcing member and projecting through and laterally from one of said pivotal connections, a sheet for preventing the contents of the file from bulging outwardly in a direction away from said middle panel, and means for securing said side panels in closed position to cooperate with said middle panel and said member to hold the paper contents of a file from folding and bending.

5. A device of the character described comprising a middle panel, a pair of side panels each having pivotal connection with one of the side edges of said middle panel, means for engaging the ends of papers confined between said middle and side panels, and a reinforcing member attached to the inner side of said middle panel and having an index tab projecting laterally beyond one of said pivotal connections.

6. A device of the character described comprising a middle panel, a pair of side panels each having its inner edge pivotally connected with said middle panel and having its end edge disconnected from said middle panel, means for holding said panels folded around papers interposed between said side and middle panels, and a reinforcing member attached to the inner side of one of said panels and having an index tab projecting beyond one of said pivotal connections.

7. A device of the character described comprising a middle panel, a pair of side panels each having its inner edge pivotally connected with said middle panel and having its end edge disconnected from said middle panel, means for holding said panels folded around papers interposed between said side and middle panels, an index tab projecting beyond one of said pivotal connections, and reinforcing sheets cooperating with said middle and said side panels respectively to prevent said panels from bending unduly, one of said sheets supporting said tab.

8. A device of the character described comprising a middle panel, a pair of side panels, pivotal connections uniting the side panels with the middle panel whereby said side panels may be folded over one upon the other to enclose the contents of a file placed upon the middle panel and one of said pivotal connections having a slot therethrough, a reinforcing member mounted against the inner surface of and strengthening the middle panel, and an index tab formed integral with said member and projecting through said slot beyond said pivotal connection having said slot therein.

9. A device of the character described comprising a middle panel, a pair of side panels, pivotal connections uniting said side panels with said middle panel and permitting said side panels to be folded over one upon the other to enclose a file placed upon the middle panel and one of said pivotal connections having a slot therein, a reinforcing sheet of material, means detachably holding said sheet against the inner surface of one of said panels, and an index tab in connection with said sheet projecting through said slot and beyond the pivotal connection containing said slot.

10. A device of the character described comprising a middle panel, a pair of side panels each having its inner edge pivotally connected with said middle panel and having its end edge disconnected from said middle panel, means for holding said panels folded around papers interposed between said side and middle panels, an index tab projecting beyond one of said pivotal connections, and reinforcing sheets cooperating with said middle and said side panels respectively to prevent said panels from bending unduly, one of said sheets supporting said tab and having foldable extensions for enclosing the ends of the contents confined between said panels.

VINCENT F. CASTLEMAN.
OSCAR J. PUTTING.